United States Patent [19]

Lotz

[11] Patent Number: 4,770,574
[45] Date of Patent: Sep. 13, 1988

[54] DISCS WITH BLADES

[75] Inventor: Heinrich Lotz, Wetzlar, Fed. Rep. of Germany

[73] Assignee: Arthur Pfeiffer Vakuumtechnik Wetzlar GmbH, Asslar, Fed. Rep. of Germany

[21] Appl. No.: 29,656

[22] Filed: Mar. 24, 1987

Related U.S. Application Data

[62] Division of Ser. No. 830,963, Feb. 19, 1986, abandoned.

[30] Foreign Application Priority Data

Mar. 1, 1985 [DE] Fed. Rep. of Germany ....... 3507274

[51] Int. Cl.⁴ ............................................. B23C 3/18
[52] U.S. Cl. .................................. 409/132; 408/1 R; 76/101 R
[58] Field of Search .................. 76/101 R; 416/237; 83/13, 29; 29/23.5, 156.8 R, 156.8 B, 156.8 P; 408/1 R; 409/131, 132, 185, 189, 190, 191, 198

[56] References Cited

U.S. PATENT DOCUMENTS

| | | | |
|---|---|---|---|
| 1,039,915 | 10/1912 | Faber | 409/131 |
| 2,633,776 | 4/1953 | Schenk | 416/223 A X |
| 2,638,312 | 5/1953 | Jedrzykowski | 29/156.8 R |
| 2,954,710 | 10/1960 | Craven et al. | 409/132 |

FOREIGN PATENT DOCUMENTS

| | | |
|---|---|---|
| 1015573 | 2/1958 | Fed. Rep. of Germany . |
| 1503704 | 3/1972 | Fed. Rep. of Germany . |
| 2050555 | 8/1973 | Fed. Rep. of Germany . |
| 2035063 | 5/1974 | Fed. Rep. of Germany . |
| 2313742 | 10/1974 | Fed. Rep. of Germany . |
| 2717366 | 10/1979 | Fed. Rep. of Germany . |
| 2654055 | 11/1979 | Fed. Rep. of Germany . |
| 2229724 | 6/1980 | Fed. Rep. of Germany . |
| 2923632 | 12/1980 | Fed. Rep. of Germany . |
| 1297182 | 5/1962 | France . |
| 1306013 | 9/1962 | France . |
| 346480 | 4/1931 | United Kingdom . |
| 652591 | 4/1951 | United Kingdom . |
| 829035 | 2/1960 | United Kingdom . |

Primary Examiner—Roscoe V. Parker
Attorney, Agent, or Firm—Toren, McGeady & Associates

[57] ABSTRACT

Slots are sawn into the edges of discs for pumps with a cup saw so as to produce blades having a curved cross-section. The blades may taper inwardly or outwardly or have no taper.

8 Claims, 4 Drawing Sheets

DISCS WITH BLADES

This is a division of application Ser. No. 830,963 filed Feb. 19, 1986 now abandoned.

BACKGROUND OF THE INVENTION

The present invention relates to discs with radially-extending blades and a method of producing such discs. Such discs are used in pumps, especially turbo-molecular pumps.

A turbo-molecular pump is composed of rotor and stator discs which are disposed alternately one behind the other and comprise rings of blades or vanes. The pump action is based on the fact that impulses in the pumping direction are transmitted to the molecules of the gas to be pumped by the blades of the rotor discs. The two important pump characteristics, namely pumping speed and pressure ratio, depend very much on the speed of rotation of the rotor discs. The pumping speed increases linearly with the speed of rotation and the pressure ratio does so exponentially. In order to achieve an optimum pump action therefore, the rotor must rotate at the highest possible speed. As a result, heavy demands are made on the blades of the rotor discs with regard to their geometry, mechanical strength and stability.

Blades for discs of turbo-molecular pumps and/or methods of producing such blades or discs are described, inter alia, in the following publications:

DE-PS 10 15 573
DE-PS 15 03 704
DE-PS 20 35 063
DE-PS 20 50 555
DE-AS 22 29 724
DE-AS 26 54 055
DE-AS 27 17 366
DE-OS 29 23 632
FR-PS 12 97 182
FR-PS 13 06 013

Becker, Nesseldreher: Neue Hochleistungsscheiben für Turbo-Molekularpumpen-Vakuum-Technik 23 (1973), 1 pages 12–15.

The blades proposed in these publications have a rectangular, rhombus-like or triangular cross-section or profile.

A prerequisite for optimum pump characteristics is a minimum thickness of the blades. This is due to the fact that, because of the desired high speed of rotation, the centrifugal force which acts on the blades, the roots of the blades and on the inner diameter of the rotor discs must be restricted to a minimum for reasons of strength. Furthermore a limited blade thickness of rotor and stator discs is desired in order to make the suction space between the blades as large as possible which is one of the prerequisites for a high pumping speed.

A limited blade thickness however, has a disadvantageous effect on the stability of the blades. As a result of resonances, for example, which occur at certain speeds of rotation during the running up to speed or running down of the rotor, oscillations may occur which can lead to contact between the blades and the stator discs, which generally leads to destruction of the pump.

Deformation and oscillations of the blades also occur in the event of venting phenomena which produce heavy forces in the axial direction.

SUMMARY OF THE INVENTION

The present invention seeks to provide blades which have a high stability in comparison with previously known blades, with a minimum blade thickness and hence optimum pump characteristics. The invention also seeks to provide a method of producing such blades. In addition, the method of production should permit such blades to be manufactured rationally. This means that as large a number of discs as possible should be capable of being machined simultaneously in one operation.

According to a first aspect, the present invention provides a method of producing discs with radially-extending blades, wherein slots are sawn in the discs by a cup saw to produce blades with a curved cross-section, said cup saw describing a radius and the radius of curvature of the blades corresponding to said radius.

According to a second aspect, the present invention provides a disc with a ring of blades, wherein said blades have a circular cross-section.

According to a third aspect, the present invention provides apparatus for producing discs with radially-extending blades, said apparatus comprising means for mounting at least one disc and a cup saw, said cup saw being disposed relative to a disc, when mounted, so as to saw said disc to produce blades with a curved cross-section.

BRIEF DESCRIPTION OF THE DRAWINGS

Preferred embodiments of the present invention will now be described, by way of example only, with reference to the accompanying drawings, of which.

DESCRIPTION OF THE PREFERRED EMBODIMENTS

Basically the present invention provides a method of producing discs with radially-extending blades, wherein slots are sawn in the discs by a cup saw whereby blades are produced with a curved cross-section, the radius of curvature corresponding to the radius which the cup saw describes. The invention also provides a disc with a ring of blades, wherein the blades have a circular cross-section.

By machining discs with a cup saw, blades with a curved cross-section are formed, that is to say blades, the cross-section of which represents a segment of a ring. Since parallel channels are formed when sawing into the discs, the wall thickness of the blades is not equal. It decreases from the outside inwards. The strength characteristics of a disc are influenced very disadvantageously as a result because a heavy mechanical loading results at the root of the blades. In order to avoid this, blades having a uniform wall thickness are produced in that either the cup saw or the apparatus to receive the discs is allowed to execute an additional movement or a cup saw is used which consists of two coaxial cylinders.

The strength characteristics of a disc can be made still more favourable by producing blades, the wall thickness of which decreases from the inside outwards. In order to achieve this, the axis of the cup saw is allowed to describe a circular motion. Thus an oscillating motion results. If the radius of this circular motion is altered, blades having a variable wall thickness can be produced. In particular blades, the wall thickness of which decreases from the inside outwards, result if the radius of the circular motion decreases during the sawing from the outer edge of the blade to the root of the blade.

Thus a rotational motion and a superimposed eccentric motion result. Since the only thing which matters is the relatively motion of the tool, in this case the cup saw, and the workpiece, in this case the apparatus on which the discs are mounted, it is fundamentally immaterial which part, tool or workpiece, executes one or both movements. The movement of translation in the direction of the axis can likewise be carried out equally well by the tool and the workpiece.

The same result, namely blades, the cross-section of which decreases from the inside outwards, is obtained if the axis of the cup saw or the axis of the apparatus on which the discs are mounted rotates on a conical surface with variable pitch instead of executing a circular motion.

In the present example of application, a cup saw is used as a tool. Any milling or grinding tool which executes the same movements as the cup saw can be used instead of a cup saw.

In preferred methods according to the invention, a plurality of discs can be machined simultaneously.

Figure 1:
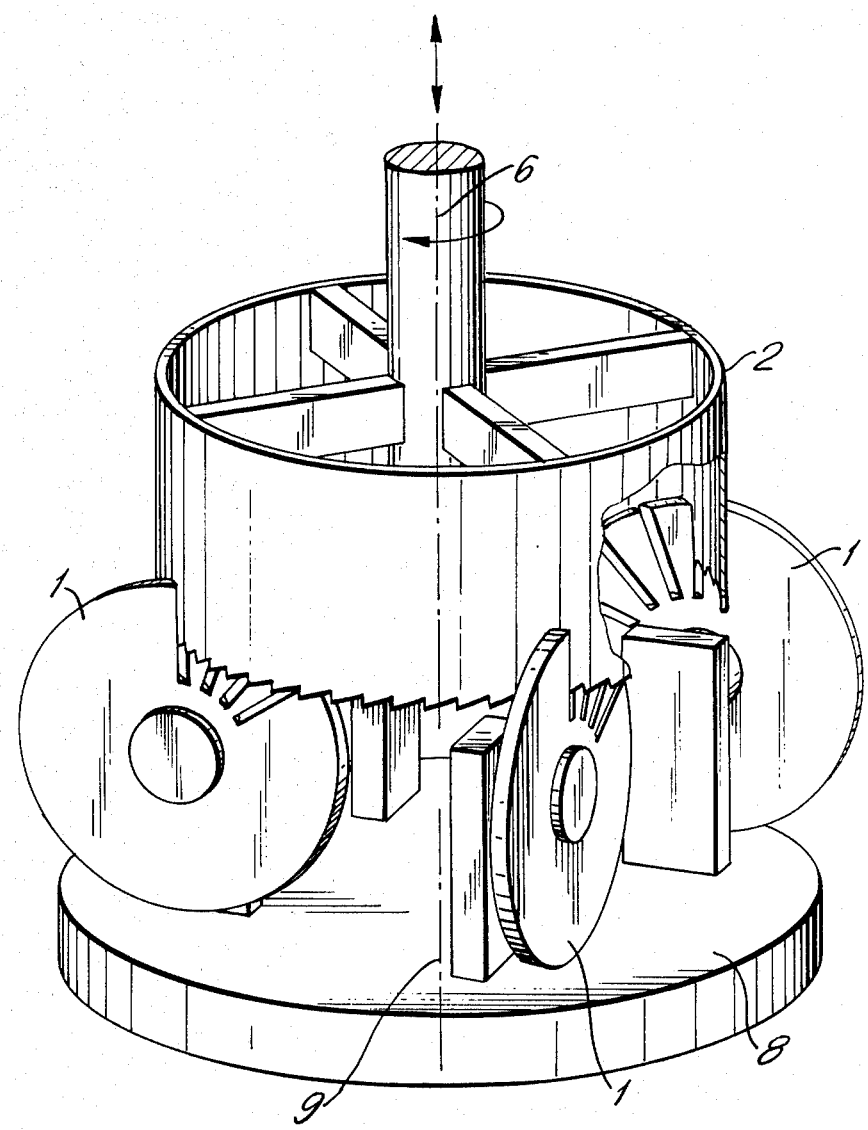
FIG. 1 shows a cup saw and an apparatus for receiving the discs for use in a method according to a first embodiment of the present invention.
Figure 4:
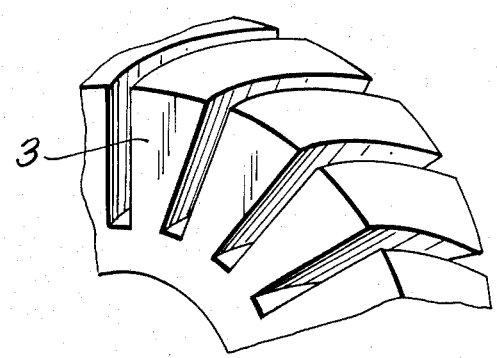
FIG. 4 shows blades having a curved cross-section and having a wall thickness which increases from the inside outwards.

Referring now to the drawings, FIG. 1 shows an apparatus 8 on which the discs 1 are mounted. Parallel slots are sawn or cut into the discs with a cup or cylindrical saw 2. The number of discs which can be machined simultaneously varies according to the size of disc in relation to the diameter of the cup saw and according to the arrangement of the discs. The relative disposition is determined by the angle of the slots to be produced in relation to the plane of the discs. With this method, discs result having blades 3 as illustrated in FIG. 4. The profile of the blades is curved. Since parallel slots are sawn with this method of production, there result blades the cross-section of which increases from the inside outwards.

Figure 2:
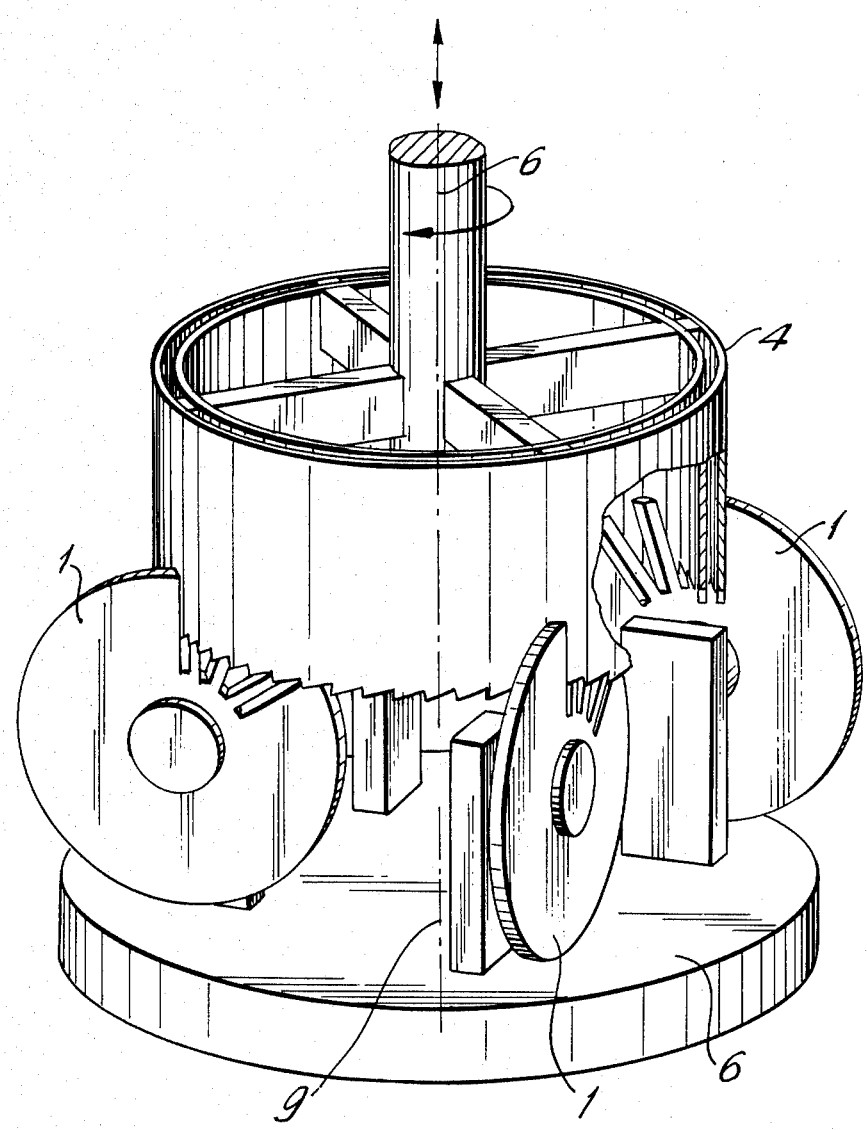
FIG. 2 shows a cup saw consisting of two coaxial cylinders and an apparatus for receiving the disc for use in a method according to a second embodiment of the present invention.
Figure 5:
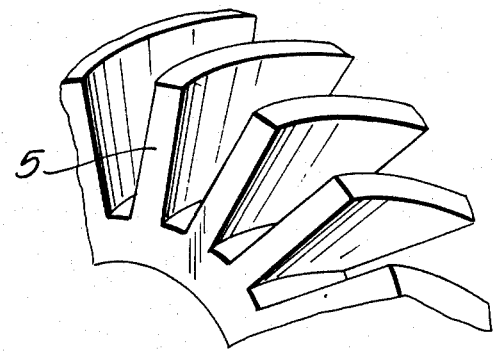
FIG. 5 shows blades having a curved cross-section and a uniform wall thickness.

The arrangement in FIG. 2 differs from that in FIG. 1 in so far as the cup saw 4 consists of two coaxial cylinders. With this method, discs result having blades 5 as illustrated in FIG. 5. The profile of the blades is curved. The wall thickness of the blades and hence their cross-section is uniform over the whole length of the blade.

Figure 3:
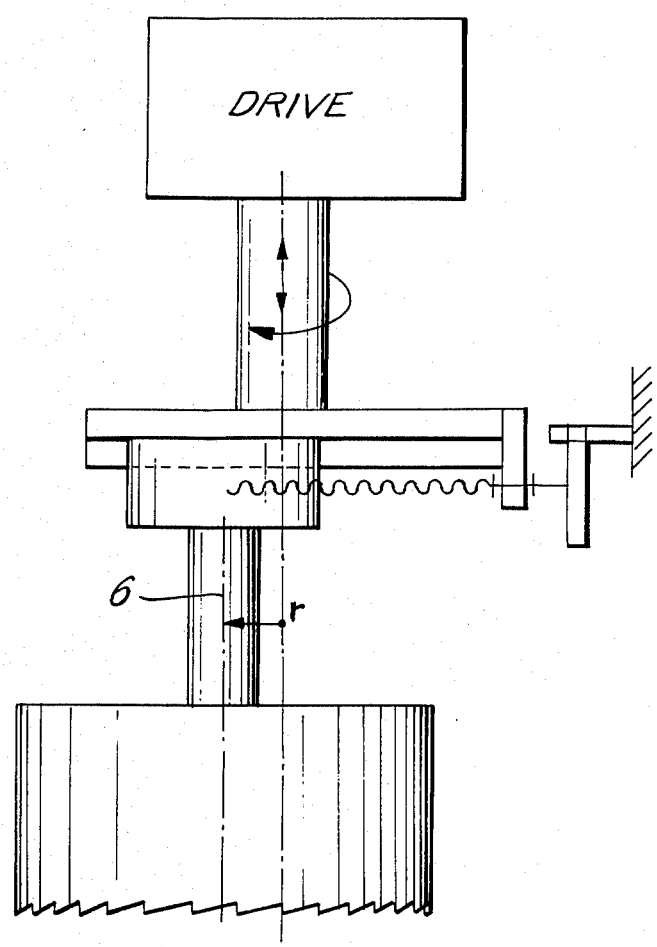
FIG. 3 shows an apparatus for producing an eccentric motion.
Figure 6:
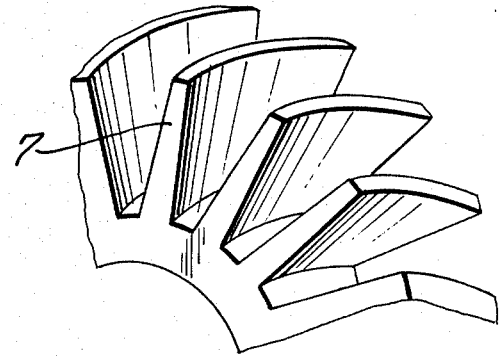
FIG. 6 shows blades having a curved cross-section with a wall thickness decreasing from the inside outwards.

If, as illustrated, in FIG. 3, the axis 6 of the cup saw of FIG. 1 or FIG. 2 is allowed to describe an arc of a circle with the variable radius r, while the radius r decreases during the sawing, then blades 7 (FIG. 6) are obtained, the wall thickness of which increases from the outside inwards. The profile of these blades is likewise curved. The discs having a uniform wall thickness, illustrated in FIG. 5, can also be produced with the arrangement in FIG. 1 if the axis of the cup saw is allowed to describe an arc of a circle, the radius of which decreases during the sawing.

In these cases, an oscillating motion of the cup saw results as well as the rotational motion. The same effect is obtained if one or both movements is allowed to be carried out by the apparatus 8 on which the discs are mounted instead of by the cup saw 2, 4. Here the axis 9 of the apparatus 8 rotates instead of the axis 6 of the cup saw 2, 4 and instead of the axis 6 of the cup saw 2, 4 describing an arc of a circle with variable radius r, this movement is taken over by the axis 9 of the apparatus 8.

As an advantageous result of the above arrangements in accordance with the invention, there are produced discs, the blades of which have a curved cross-section. As a result, the stability of the blades is considerably improved without having to renounce the optimum pump characteristics such as are afforded by a minimum blade thickness. The wall thickness of the blades may decrease from the inside outwards as a result of which the strength characteristics are considerably improved. A more rational production is afforded as a result of the fact that a plurality of discs can be machined simultaneously.

It will be understood that the above description of the present invention is susceptible to various modifications, changes and adaptations.

What is claimed is:

1. A method of producing discs with radially-extending blades with the discs having a radially outer edge, comprising the steps of sawing slots in the discs using a cup saw with an axis to produce blades with a curved cross-section, with the cup saw describing a radius and the blades having a radius of curvature corresponding to said radius, sawing the discs with said cup saw radially inwardly from the outer edge of the discs, moving the axis of said cup saw for executing a circular motion with a variable radius thereby resulting in an oscillating motion of said cup saw, varying said radius in such a manner that it decreases during said radially inward sawing whereby blades are formed having the same wall thickness from the root of the blade to the outer radius.

2. A method of producing discs with radially-extending-blades with the discs having a radially outer edge, comprising the steps of sawing slots in the discs using a cup saw with an axis to produce blades with a curved cross-section, with the cup saw describing a radius and the blades having a radius of curvature corresponding to said radius, mounting the discs on an apparatus having an axis parallel to said axis of said cup saw and, while sawing with said cup saw radially inwardly from the outer edge of the discs, executing a circular motion with said axis of said apparatus with the circular motion having a variable radius thereby resulting in an oscillating motion of said apparatus, and varying said variable radius in such a manner that it decreases during said radially inward sawing whereby blades result having the same wall thickness from the root of the blade to the outer radius.

3. A method of producing discs with the radially-extending blades with the discs having a radially outer edge, comprising the steps of sawing slots in the discs using a cup saw with an axis to produce blades with a curved cross-section, with the cup saw describing a radius and the blades having a radius of curvature corresponding to said radius, said cup saw comprises two coaxial cylinders of different diameters each sawing the discs.

4. A method of producing discs with the radially-extending blades with the discs having a radially outer edge, comprising the steps of sawing slots in the discs using a cup saw with an axis to produce blades with a curved cross-section, with the cup saw describing a radius and the blades having a radius of curvature corresponding to said radius, mounting the discs on an apparatus having a axis parallel to the axis of said cup saw, executing a circular motion with one of the axis of said cup saw and said axis of said apparatus for executing a circular motion with a variable radius, for effecting an oscillating motion of said cup saw and forming blades having a variable wall thickness.

5. A method as claimed in claim 4, including the additional step of varying said radius of said circular motion in such a manner that it decreases as said cup saw saws radially inwardly from the outer edge of the discs whereby blades are formed having a cross-section increasing from the outer edge inwards.

6. A method as claimed in claim 1, 2, 3 or 4 wherein a plurality of discs are machined simultaneously.

7. A method of producing discs with radially-extending blades with the discs having a radially outer edge, comprising the steps of sawing slots in the discs using a cup saw with an axis to produce blades with a curved cross-section, with the cup saw describing a radius with the blades having a radius of curvature corresponding to said radius, mounting the discs on an apparatus, and rotating said apparatus instead of said cup saw.

8. A method as claimed in claim 1, 2, 3 or 4, wherein using one of a milling and grinding tool in place of said cup saw.

* * * * *